United States Patent [19]
Stolk

[11] Patent Number: 6,060,181
[45] Date of Patent: May 9, 2000

[54] LOW LOSS MAGNETIC ALLOY

[75] Inventor: Richard D. Stolk, Chesterfield, Mo.

[73] Assignee: McDonnell Douglas Corporation, St. Louis, Mo.

[21] Appl. No.: 09/134,982

[22] Filed: Aug. 17, 1998

[51] Int. Cl.[7] ................................................ G11B 5/66
[52] U.S. Cl. ........................ 428/694 T; 428/694 SL; 428/900; 427/128; 427/129; 427/130; 148/302; 148/310; 148/313; 75/246; 75/254
[58] Field of Search ......................... 428/694 T, 694 SL, 428/900; 427/128–130; 148/302, 310, 313; 75/246, 254

[56] References Cited

U.S. PATENT DOCUMENTS

| | | | |
|---|---|---|---|
| 3,445,624 | 5/1969 | Sunnen | 219/146.22 |
| 3,555,265 | 1/1971 | Feller et al. | 252/62.55 |
| 3,607,675 | 9/1971 | Haines | 427/132 |
| 3,698,055 | 10/1972 | Holtz, Jr. et al. | 75/246 |
| 3,986,901 | 10/1976 | Plante et al. | 148/105 |
| 4,002,507 | 1/1977 | Radeloff et al. | 148/310 |
| 4,054,530 | 10/1977 | Detteyes | 252/62.54 |
| 4,150,981 | 4/1979 | O'Hendley | 148/403 |
| 4,381,943 | 5/1983 | Dickson | 75/356 |
| 4,661,216 | 4/1987 | Anderson et al. | 205/260 |
| 4,761,327 | 8/1988 | Hamano et al. | 428/220 |
| 4,780,781 | 10/1988 | Sano | 360/126 |

OTHER PUBLICATIONS

Billas, et al., "Magnetism from the Atom to the Bulk in Iron, Cobalt, and Nickel Clusters," Science, vol. 265, Sep. 16, 1994, pp. 1682–1684.

Gibson, et al., "Synthesis and Characterization of Anisometric Cobalt Nanoclusters", vol. 267, Mar. 3, 1995, pp. 1338–1340.

*Primary Examiner*—Leszek Kiliman
*Attorney, Agent, or Firm*—Westerlund & Powell, P.C.; Robert A. Westerlund

[57] ABSTRACT

A more resistive, low loss magnetic alloy containing at least 80% cobalt, at least 10 wt % iron, about 2.5 wt % nickel, and about 0.3–2 wt % impurities including boron and manganese. The alloy is well suited for deposition upon dielectric substrates such as polyimide or polyester tape by electroless deposition processes and allows for greater film thickness in a single layer and that has lower loss than other alloys presently available for such uses.

20 Claims, 1 Drawing Sheet

LOW LOSS MAGNETIC ALLOY

BACKGROUND OF THE INVENTION

This invention relates to low loss magnetic alloys containing predominantly cobalt with lesser amounts of iron and nickel with still lesser amounts of boron and manganese. More particularly, this invention relates to cobalt based alloys having at least 80wt % cobalt (Co), at least 10wt % iron (Fe), and about 2–5wt % nickel (Ni). Still more particularly, this invention relates to the alloy in the form it takes after deposition in an electroless plating process.

Cobalt based alloys have been employed for a variety of purposes, some as structural elements and some as coatings. With regard to the structural uses a high cobalt content alloy can provide for good hot-rolling performance combined with good hot hardness. See for example U.S. Pat. No. 3,445,624 which discusses this class of alloys and proposes a 93%+Co, 3–4% Fe with additional trace elements alloy in which no significant amount of Ni should be present. The presence of nickel thwarts good malleability which is important for the application taught therein. U.S. Pat. No. 3,698,055 discusses heat resistant alloys of iron, cobalt and/or nickel that are heat resistant as well as easily workable and castable. These alloys find use as cutting tools, dies and wear parts and further use as structural parts in high heat environments. These alloys comprise 0.5–4% carbon, 5–60% of a carbide-former (tungsten and/or molybdenum) with the balance being Co/Fe/Ni in varying amounts. This reference teaches that no 'reactive elements' such as Cr, Al, Cb, Mn, Ta, Ti, V, Zr, etc. be present in the mixture because their oxides, formed at the high temperatures at which the alloy is prepared, are hard to remove and are detrimental to the best high temperature performance of the alloys.

This class of alloys is often prepared as a powder. This powder can be cast into a solid part or can be used directly as a coating on a substrate. One use for such coatings is taught in U.S. Pat. No. 4,381,943 for use as a coating with enhanced wear and corrosion resistance. These alloys are prepared as microcrystalline, chemically homogeneous powders that are plasma-flame deposited onto a substrate to form the desired coating. The mixture is described as containing boron of between 5–30 at %, various other additives, including manganese (to increase the strength of the coating) with the bulk of the alloys comprising Co, Fe and Ni. No magnetic properties of the alloys are discussed or are apparent.

Cobalt exhibits magnetic behavior. As such, it has been employed in various alloys to emphasize its magnetic aspects. U.S. Pat. No. 4,002,507 describes a group of alloys that are formed by melting together the pure constituents of the alloy, casting them into an ingot and then carefully cold deforming the cast shape by at least 70% and then carefully annealing the formed shape in order to achieve the highest values for coercive force and remanence. These alloys range between Co 10–45 wt %, Fe 25–65 wt %, and Ni (+Al and/or Ti) 10–40 wt %. Neither boron nor manganese are mentioned as being included in this alloy system. U.S. Pat. No. 4,150,981 describes a glassy alloy containing cobalt, nickel and iron that evidences near-zero magnetostriction and high saturation induction. The composition is 13–73 at % Co, 5–50 at % Ni and 2–17 at % Fe (totaling about 80 at %) with the balance being boron with incidental impurities. The alloy is formed by drawing a continuous ribbon or wire from a melt and then rapidly quenching it (at least 105° K./sec). The alloy remains in this form for use. The high saturation inductance of the alloy is partially the result of the high boron content.

The cobalt alloys that exhibit the magnetic properties are also formed as powders for subsequent deposition upon a substrate. U.S. Pat. No. 4,054,530 describes an alloy of Co 50–82 wt %, Fe 10–33 wt %, and Ni (for which Mn can be substituted with an attendant lowering of the magnetic moment) 8–30 wt %. The object is to form a powder of single domain acicular crystals by first forming an organometallic salt precursor and then conducting a reduction reaction to form the alloy powder at about 650° C. Boron is not mentioned as being a constituent of this particular alloy. The alloy powder is then coated onto a plastic substrate (i.e. PET) for use as a magnetic recording medium.

A related reference, U.S. Pat. No. 4,761,327 describes the preparation of a polyester substrate onto which a number of known magnetic alloy compositions can be deposited by a variety of techniques. Listed among the various magnetic alloys is a generic mention of the Co/Fe/Ni magnetic alloys, and listed among the various methods of deposition is electroless plating. Since the thrust of this reference is the preparation of the polyester substrate rather than the optimization of a particularly magnetic alloy, no details are given as to the magnetic alloys or how they are deposited onto the polyester substrate.

U.S. Pat. No. 5,011,581 teaches electroplating of Co/Fe/Ni alloys onto a metallic substrate by conventional electroplating methods. These methods, however, require a conductive substrate, preferably a metal, to act as one of the electrodes in the electroplating system. Hence, if one desires to emplace a magnetic alloy onto a dielectric substrate such as a polyester film as described above, one must employ it as part of a laid-on liquid coating mixture that is subsequently evaporated, leaving the magnetic alloy powder and an adhesive binder on the surface of the dielectric substrate. This presents a number of disadvantages.

The art of electroless plating offers a means of applying metallic coatings to dielectric substrates. Andersen (U.S. Pat. No. 4,661,216) presents a triangle diagram of the cobalt, nickel, iron alloys prepared by a sputtering technique presented by C. H. Tolman "Non-Magnetostrictive Compositions of Fe—Ni—Co Films" published in the Journal of Applied Physics, 38, pp. 3409–3410, (1967). Of interest for magnetic materials, a line on the diagram is identified for compositions of zero magnetostriction. Permalloy, having a 80–82% nickel 20–18% iron composition, is near the zero magnetostriction line at high nickel compositions. At the other end of the line with less than 10% nickel, the alloys having high cobalt concentrations (at or greater than 80%) also fall on the zero magnetostriction line. This makes them good alloy compositions for magnetic applications. Sano, U.S. Pat. No. 4,780,781, defines a Co—Ni—Fe—B alloy composition in regard to low magnetostriction characteristics as Co is 62–95 weight %, Ni is 3–30 weight %, Fe is 2–8 weight %, and B is 0.05–0.5 weight % prepared by electroplating at pH from 2.5–3.5.

It must be remembered that the ternary diagram presented by Andersen is only a guide, when preparing similar alloy compositions via electroless plating. Unless hydrazine is used as the reducer, phosphorus from sodium hypophosphite and boron from dimethyl amine borane (DMAB) reducers, respectively, are incorporated in the alloy as by products of the chemical reaction that takes place during electroless plating. Depending upon the application for which the alloy is prepared, certain properties will be optimized for that particular end use.

Present magnetic alloys employed in computer memories, tape heads and other electromagnetic applications are often limited in their performance by the noise and/or loss characteristics of the material. The signal to noise ratio of the material is related to the manner in which electromagnetic energy interacts with the domains, the domain walls, etc. or the basic morphology of the material.

In the past, permalloy, which is a composition of about 80% nickel and 20% iron was identified as a material that had many desirable properties such as high permeability and low coercivity, usually referred to as a soft magnetic material when compared to other materials thought of as permanent magnets.

The limitations of the use of these permalloy materials in various applications center on the "skin" depth of the material which depends upon the inherent composition, magnetic properties, resistive properties and morphology of the material. The resistivity of permalloy has been reported to be about 20 $\mu\Omega$cm. A material thickness may be calculated by an equation that expresses skin depth as a function of material properties as well as the frequency at which the measurement is made. This leads to a realization that the properties of the metal alloy material are generally frequency dependent, although its resistance may be approximately constant over a wide frequency range. There exists a need in the art for a more resistive magnetic alloy that allows for greater film thickness in a single deposited layer and that has lower loss than is presently available. Single layer thickness for a Permalloy film normally will be less than 5000 Å because thicker layers result in significantly greater resistance.

The prior art of electroless plating of these Co—Ni—Fe metals often includes a host of organic stabilizers, surfactants, wetting agents, and exhaltants to increase the bath stability while increasing the overall plating rate by increasing bath temperature, reducer and metals concentrations in the bath. The prior art of electrolessly plating three or more metal components includes: Co—Ni—Mn—P by T. Osaka, J. Electrochem. Soc. 130, (3), 568–571, (1983); and Co—Ni—P by T. Homma, et al., Trans. J. on Magnetics, 6 (9), (1991). G. E. Fish (Proceeding of the IEEE) 78, (6), p. 947–971, (1990) relates the morphology of the alloy (grain size and surface texture) to the fundamentals of core loss and the inherent resistance of the alloy. Iron- (Ni, Co) alloys are cited having resistances of 35–58 microohm-centimeter for compositions up to 49% Co–2% V (permendur). However, only ferrites (MnZn and NiZn) have higher intrinsic resistance than the Co—Ni—Fe alloys. Thus the combination of the Co—Ni—Fe elements in the invention provides a high resistivity, soft magnetic alloy with low loss.

One should note that the loss characteristic of a material may be reported in different ways. Loss tangent of a material is the ratio of the imaginary to the real part of the permeance. A loss factor may be defined as the difference in the real and imaginary permeance values measured at a given frequency, ranging from 50 Mhz–2 Ghz. These measures of loss are different than core loss (watts/kg) reported by G. E. Fish. Others including K. Yoshida, J. Appl. Phys., 64, (1), PP. 270–275, 1988, have tried to correlate the magnetic properties of electroless-plated Co—Ni—P with media noise on plated disks. Still others including R. J. Prosen, et al., J. Appl. Phys., 34 (4), p. 1147–1148, 1963, have tried to relate loss to surface roughness and Ludwig, U.S. Pat. No. 4,550, 036, who related plating texture to oxygen level in the plating bath. Finally, T. Akashi, Tans. JIM, 2, 1961, added CaO and $SiO_2$ particles to MnZn ferrite in an attempt to lower loss by increasing the resistivity of the ferrite and thus improve the magnetic characteristics by reducing eddy current loss white keeping high permeability.

Based on the above and foregoing, it can be appreciated that there presently exists a need in the art for a more resistive Co/Fe/Ni magnetic alloy and method for applying such an alloy to a dielectric substrate such as that used for magnetic recording media, which overcomes the above-described drawbacks and shortcomings of the presently available technology. The present invention fulfills these needs in the art with an alloy having 100 microohm centimeters resistance, about five times higher than permalloy.

SUMMARY OF THE INVENTION

The present invention encompasses a more resistive, low loss magnetic alloy comprising cobalt, nickel, and iron with minor amounts of boron and manganese that is optimized for application in an electroless deposition system. By use of the electroless deposition method, this magnetic alloy can be readily applied to a variety of surfaces, most particularly dielectric surfaces that have been activated by commercially available palladium colloid catalysts. The present alloy composition has approximately five times the resistance of permalloy. When compared to cobalt-nickel-iron alloys having only five or less percent iron therein, it exhibits one third to one half the loss characteristics at a given permeance level at high frequency.

In general the low loss magnetic alloy comprises at least 80 wt % Co, about 2–5 wt % Ni (or none, see below), at least 10 wt % Fe and about 0.3–2 wt % impurities, said impurities including B and Mn. If dielectric substrate has been pre-plated with Ni, the Ni can be omitted from the alloy composition. More specific compositions are set forth below in the detailed description as well as the techniques to deposit a coating of this alloy upon a substrate. The magnetic alloy will find its most common use when deposited upon a polymeric material as a substrate for uses that include video and audio magnetic recording tape. The magnetic alloy may also be applied to a continuous sheet of polymeric material substrate to be cut or trimmed into various shapes for other applications.

DETAILED DESCRIPTION OF THE INVENTION

Figure 1:
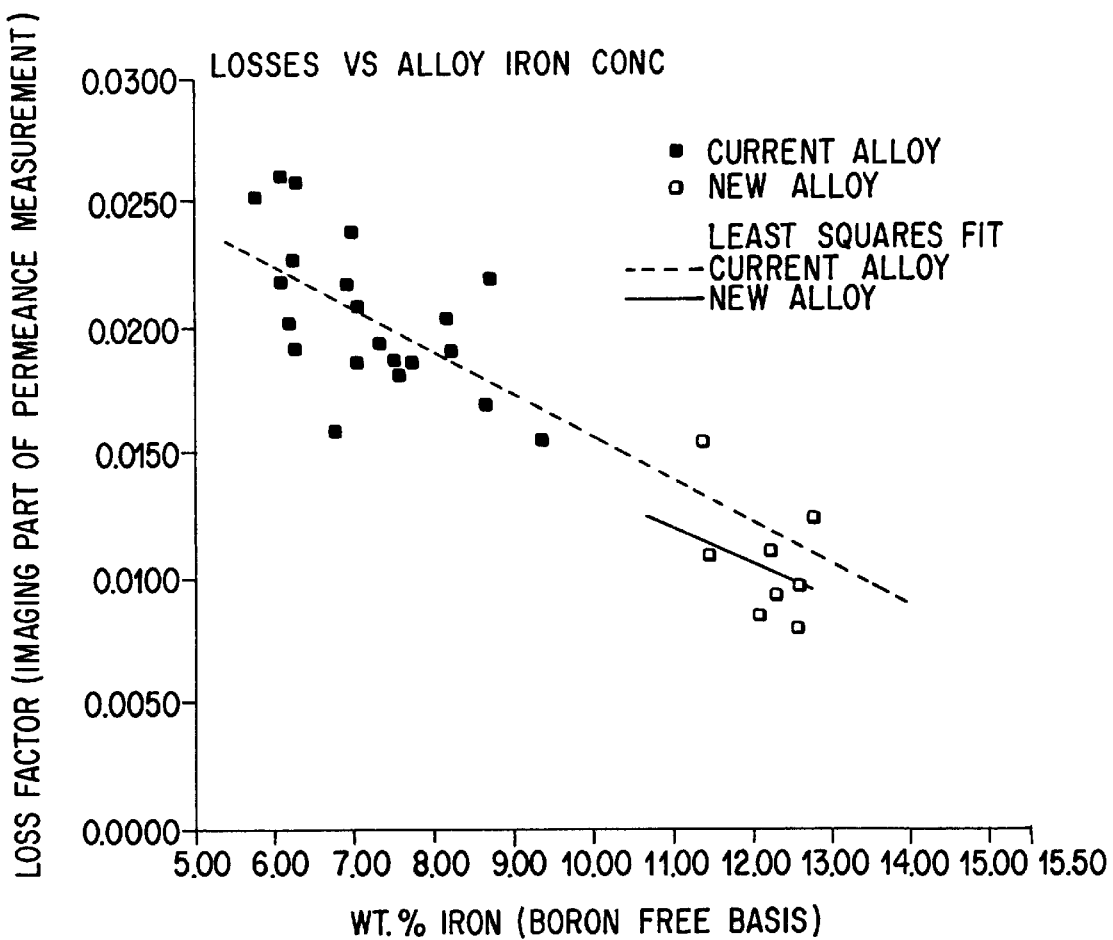
FIG. 1 is a graph showing loss factor as a function of the amount of iron in the alloy of the present invention, showing the difference above and below about 10% Fe in the alloy.

The present invention provides for a novel Co/Ni/Fe or Co/Fe magnetic alloy that can be deposited on a variety of different substrates by an electroless deposition technique. The details of the various embodiments of the alloy composition as well as the application of the alloy to various substrates is set forth in the Examples found below. Those skilled in the art will appreciate that other and further embodiments are apparent and within the spirit and scope of this invention from the teachings of these present examples taken with the accompanying specification.

The prior art contemplates a variety of methods of electrolessly depositing magnetic alloys upon dielectric substrates. Common industry practice is to utilize sulfate or sulfomate chemistry for the salts in the plating bath for this purpose which yield alloys with reduced stress levels. Another method is to utilize chloride chemistry, but this appears to add stress to the resulting films which decreases the magnetic performance. This causes a reduced permeance level in the alloy and creates mechanical problems for the adhesion of the alloy film to the substrate.

The alloys of the present invention are best applied to a dielectric substrate by using sulfate salts in the following manner. The bath pH can be between 2.0 and 7.0, preferably between 3.0 and 6.5. The bath temperature (° C.) is between 40 and 75, with 50 to 65 being preferred. The metal salt solutions are made up of either sulfate, chloride or sulfamate salts in the following metal ion ratios. Co++/Ni++ can be 3:1 to 25:1, with 6:1 to 25:1 being preferred. Co++/Fe++ can be 2:1 to 3:1, with 2.5: to 3:1 being preferred. Fe++/Ni++ can be 1:1 to 10:1 with 1:1 to 5:1 being preferred. Fe++/Mn++ can be 100:1 to 2:1, with 10:1 to 2:1 being preferred. Boron can be added as boric acid or by depletion of DMAB reducer at greater than 125 ppm. It is preferred to incorporate dimethyl amine borane (DMAB) into the plating bath as a reducing agent.

FIG. 1 presents the data for loss factor as a function of the percentage of Fe in the CoFeNiBMn alloys of the present invention. The data are for the alloys after they were electrolessly plated to a thickness of about 15,000 Å±2000 Å on to a polyimide substrate. The alloys range from about 6 wt % Fe to about 9.5 wt % Fe (below the range of Fe for the present invention) and have loss factors ranging from about 0.026 to about 0.015. The alloys of the present invention range from about 11.4 wt % Fe to about 15.5% Fe (loss values above 13 wt % Fe not shown on graph but done experimentally) and have loss factors ranging from about 0.015 to about 0.0075. The loss factor is the imaginary component of the complex permeance measurement. The reduction in loss factor is about 50% from these alloys with less than 10 wt % Fe and appears to be the result of increasing the Fe in alloy to levels above 10 wt %. In the graph, the alloy compositions were, starting with the particular amount of Fe, B about 2 wt % or less, Mn is about 0.5 wt % or less, and the balance is Co and Ni with Co in excess of 80% by weight. If Ni has been pre-plated onto the substrate, the Ni can be omitted from the alloy. All results were on a polyimide substrate (Kapton® HN). The loss factor was measured at 150 MHz.

In an acidic pH electroless plating bath containing at least 100 ppm of Co, Ni (optional), Fe metal salts of chloride and/or sulfate, cobalt will plate preferentially over nickel, iron and other metals once the polymeric surface has a nickel "strike" or preplate of nickel-containing alloy on it. Nickel boron or nickel phosphorus alloys are formed from nickel containing baths that use dimethyl amine borane (DMAB) and sodium hypophosphite ($NaH_2PO_2 \cdot H_2O$) as reducing agents, respectively. Alternatively the nickel salt (generally nickel chloride or sulfate) may be added to the cobalt containing bath which will result in a Co—Ni—X alloy where X is the boron or phosphorus depending upon the reducing agent. Electroless plated alloys that are very high in cobalt concentration tend to be stressed and are brittle. Nickel provides the adhesion to the polymer surface activated with a commercial palladium colloid catalyst as provided by Shipley, Inc. (Marlborough, Mass.) or McDermid, Inc. (Waterbury, Conn.). Manganese helps nickel initiate plating in preference to iron and cobalt on the palladium catalyst surface.

The addition of iron to the alloy provides ductility and allows plating up to ten microns in thickness before the metal becomes so stressed that it delaminates from the polymer substrate. A Co—Fe—B alloy started on a nickel alloy surface using DMAB as a reducer can be plated over a rather wide pH range, 3–6, although the ratio of Co to Fe will be affected both by pH and by the temperature of the bath. Bath temperatures can range from less than 50° C. to near 70° C., at which temperature the DMAB begins to decompose. Using sodium hypophosphate as a reducer with the same 100 ppm concentration of the three metals Co, Ni, and Fe, nickel will be preferentially plated over iron and cobalt with the bath pH in the alkaline range (>7). Bath concentrations typically used for plating baths are like those disclosed by Sano (U.S. Pat. No. 4,780,781) which is incorporated by reference herein in its entirety.

I have found that, to achieve high magnetic performance of alloys containing Co—Ni—Fe, the total organic content in the plating bath must be minimized to obtain a morphology similar to that which is formed by vapor deposition or vacuum sputtering of the metals. The lack of stabilizers tends to make the bath unstable, but this can be compensated for by operating at lower metal and reducer concentrations and at lower temperatures.

Although various embodiments of the present invention have been described in detail hereinabove, it should be clearly understood that many variations and/or modifications of the basic inventive concepts herein taught which may become apparent to those skilled in the pertinent art will still fall within the spirit and scope of the present invention as defined in the appended claims.

What is claimed is:

1. A magnetic alloy consisting essentially of at least 80 wt % cobalt, at least 10 wt % iron, about 0–5 wt % nickel, and about 0.3–2 wt % impurities including boron and manganese.

2. A magnetic alloy consisting essentially of at least 80 wt % cobalt, at least 10 wt % iron, about 2–5 wt % nickel, and about 0.3–2 wt % impurities including boron and manganese, said alloy being formed from an aqueous electroless plating bath containing the sulfate, chloride or sulfamate salts of these elements and dimethyl amine borane as a reducing agent.

3. The alloy of claim 2 wherein the aqueous electroless plating bath consists essentially of water; Co, Ni, Fe and Mn sulfates; boric acid as a buffer; and dimethyl amine borane (DMAB) as a reducing agent, with the bath having an acid pH.

4. The alloy of claim 3 wherein the ratio of cobalt++ to nickel++ in the bath is between 3:1 and 25:1.

5. The alloy of claim 3 wherein the ratio of cobalt++ to iron++ in the bath is between 2:1 and 3:1.

6. The alloy of claim 5 wherein the ratio of cobalt++ to iron++ in the bath is between 2.5:1 and 3:1.

7. The alloy of claim 3 wherein the ratio of iron++ to nickel++ in the bath is between 1:1 and 10:1.

8. The alloy of claim 7 wherein the ratio of iron++ to nickel++ in the bath is between 1:1 and 5:1.

9. The alloy of claim 3 wherein the pH of the bath is between 2.0 and 7.0.

10. The alloy of claim 3 wherein the temperature of the bath is between 40° C. and 75° C.

11. A magnetic alloy consisting essentially of at least 80 wt % cobalt, at least 10 wt % iron, and about 0.3–2 wt % impurities including boron and manganese, said alloy being formed from an aqueous electroless plating bath containing the sulfate, chloride or sulfamate salts of these elements and dimethyl amine borane as a reducing agent and onto a polymer film that has been pre-plated with Ni.

12. A structure comprising a dielectric substrate onto a least one side of which is deposited a magnetic alloy consisting essentially of at least 80 wt % cobalt, at least 10 wt % iron, about 0–5 wt % nickel, and about 0.3–2 wt % impurities including boron and manganese.

13. The structure of claim 12 wherein the substrate comprises a polymer.

14. The structure of claim 13 wherein the polymer is a polyester or a polyimide.

15. The structure of claim 12 wherein the magnetic alloy is deposited by an electroless deposition process.

16. The alloy of claim 1 wherein said alloy has a loss factor ranging from about 0.015 to about 0.0075.

17. The alloy of claim 1 wherein said alloy contains said iron in an amount ranging from about 11.4 to about 15.5 wt %.

18. The alloy of claim 1 wherein said alloy has a resistance of 100 microohm centimeters.

19. The structure of claim 12 wherein magnetic alloy has a thickness of about 15,000 Å±2,000 Å.

20. The structure of claim 12 wherein said structure comprises a magnetic recording medium.

* * * * *